(12) United States Patent
Zemel et al.

US011644241B2

(10) Patent No.: US 11,644,241 B2
(45) Date of Patent: May 9, 2023

(54) BEVERAGE HOLDER ASSEMBLY CONFIGURED FOR A FIRE PIT

(71) Applicant: Mr. Bar-B-Q Products LLC, Melville, NY (US)

(72) Inventors: Marc Zemel, Melville, NY (US); Joanne Rudis, Melville, NY (US)

(73) Assignee: MR. BAR-B-Q PRODUCTS LLC, Hauppauge, NY (US)

( * ) Notice: Subject to any disclaimer, the term of this patent is extended or adjusted under 35 U.S.C. 154(b) by 0 days.

(21) Appl. No.: 17/191,955

(22) Filed: Mar. 4, 2021

(65) Prior Publication Data

US 2022/0282923 A1    Sep. 8, 2022

(51) Int. Cl.
*A47J 37/07* (2006.01)
*F27D 21/00* (2006.01)
*A47G 23/02* (2006.01)

(52) U.S. Cl.
CPC .............. *F27D 21/00* (2013.01); *A47G 23/02* (2013.01)

(58) Field of Classification Search
CPC .... A47J 37/07; A47J 37/0786; A47J 37/0763; A47J 2037/0795; A47G 19/22; A47G 23/02; A47G 29/093; F24B 3/00; F24B 5/00
See application file for complete search history.

(56) References Cited

U.S. PATENT DOCUMENTS

| 2,690,950 | A | * | 10/1954 | Nordmark | .............. | A47B 41/02 |
| | | | | | | 248/278.1 |
| 3,784,142 | A | | 1/1974 | O'Brien | | |
| 4,892,281 | A | | 1/1990 | DiFilippo et al. | | |
| 5,586,804 | A | | 12/1996 | Burroughs | | |
| 5,694,917 | A | | 12/1997 | Giebel et al. | | |
| 5,813,646 | A | * | 9/1998 | Bartholomae | .......... | B63B 29/06 |
| | | | | | | 248/311.2 |
| 5,853,158 | A | * | 12/1998 | Riggle | ............... | A47G 23/0225 |
| | | | | | | 248/278.1 |
| 6,799,567 | B1 | | 10/2004 | Genest | | |
| D593,930 | S | | 6/2009 | Fossett | | |
| 7,665,456 | B2 | | 2/2010 | DeMars | | |
| 8,336,841 | B2 | | 12/2012 | Ercolano | | |

(Continued)

FOREIGN PATENT DOCUMENTS

AU    2018100472 A4    5/2018
AU    2018220066 A1    4/2019

(Continued)

OTHER PUBLICATIONS

European Search Report & Written Opinion issued in corresponding EP Application No. 22157678, dated Jun. 28, 2022, pp. 1-7.

*Primary Examiner* — Gregory A Wilson

(74) *Attorney, Agent, or Firm* — Carter, DeLuca & Farrell LLP

(57) ABSTRACT

Technologies are described for devices to hold a cup, mug, glassware, bottle, can, thermos, or other beverage container for a fire pit. The device may comprise a beverage holder assembly. The beverage holder assembly may comprise a beverage holder. The beverage holder assembly may comprise a bracket. The bracket may have a first side and a second side. The first side of the bracket may be attached to an underside of a mantel of a fire pit. The second side of the bracket may be attached to the beverage holder.

18 Claims, 6 Drawing Sheets

(56) References Cited

U.S. PATENT DOCUMENTS

| | | | |
|---|---|---|---|
| 8,636,319 B1 * | 1/2014 | Parker, Jr. | A47C 7/62 |
| | | | 297/188.21 |
| 9,109,744 B1 * | 8/2015 | Guerrero | A47G 23/02 |
| 9,532,654 B1 | 1/2017 | Adams, IV et al. | |
| D807,105 S * | 1/2018 | Moss | D7/334 |
| 10,722,037 B2 * | 7/2020 | Pendleton, Jr. | A47C 7/624 |
| 10,821,872 B2 * | 11/2020 | Bates | B60N 3/001 |
| 10,888,195 B1 | 1/2021 | Norris et al. | |
| 10,981,654 B2 * | 4/2021 | Slack, Jr. | A47G 23/0225 |
| 2003/0111070 A1 * | 6/2003 | DeMars | A47J 37/0704 |
| | | | 126/25 R |
| 2007/0215165 A1 | 9/2007 | Mazakis | |
| 2008/0061195 A1 * | 3/2008 | Carnevali | F16M 13/02 |
| | | | 248/125.8 |
| 2012/0090589 A1 * | 4/2012 | Fisher | F24B 1/191 |
| | | | 126/80 |
| 2015/0321593 A1 * | 11/2015 | North | B60N 3/102 |
| | | | 224/544 |

FOREIGN PATENT DOCUMENTS

| | | | | |
|---|---|---|---|---|
| CN | 201700987 U | 1/2011 | | |
| EP | 2674083 A1 | 12/2013 | | |
| IN | 201641043950 | 1/2017 | | |
| KR | 101780387 B1 | 9/2017 | | |
| KR | 1900223 B1 * | 9/2018 | | A47B 13/088 |
| WO | 2006108510 A1 | 10/2006 | | |

* cited by examiner

BEVERAGE HOLDER ASSEMBLY CONFIGURED FOR A FIRE PIT

TECHNICAL FIELD

The present disclosure generally relates to outdoor grills and/or fire pits, and more particularly, to multi-function fire pit apparatuses with a beverage holder assembly configured to attach to the fire pit.

BACKGROUND

Unless otherwise indicated herein, the materials described in this section are not prior art to the claims in this application and are not admitted being prior art by inclusion in this section.

A fire pit is an apparatus configured to contain a fire and prevent the fire from spreading. A fire pit may be made from various materials including metal, concrete, clay, stone, mortar, brick, etc. A fire pit may be used as a source of heat, to add ambience to an outdoor location, or as an entertainment gathering point.

Fire pits generally comprise a mantel or table around the fire bowl to add style and design as well as provide safety while keeping the fire at a distance from anything coming too close to the fire or anyone walking around the fire pit. However, a fire hazard could arise if people use the mantel or table around the fire pit for resting or storing their drinks in a glass or plastic cup, their bottle or can, plates with food, etc. which then has a risk of burning or catching on fire.

Typically, fire pits are not configured to store or hold anything in a safe and convenient way. Thus, there is a continuing interest in developing safe multi-functional fire pits that are not a safety hazard to the user.

SUMMARY

Existing challenges associated with the foregoing, as well as other challenges, are overcome by the presently disclosed multi-functional fire pits to help users safely and conveniently store or hold their beverage container such as a drinking cup, mug, glassware, bottle, can, thermos, or any other contemplated beverage container while relaxing around a fire pit.

One embodiment of the present disclosure is a device to hold a beverage for a fire pit. The device may comprise a beverage holder assembly. The beverage holder assembly may comprise a beverage holder. The beverage holder assembly may comprise a bracket. The bracket may have a first side and a second side. The first side of the bracket may be attached to an underside of a mantel of a fire pit. The second side of the bracket may be attached to the beverage holder.

Another embodiment of the present disclosure includes a device to hold a beverage for a fire pit. The device may comprise a beverage holder assembly. The beverage holder assembly may comprise a beverage holder. The beverage holder assembly may comprise a bracket. A first side of the bracket may be attached to an underside of a mantel of a fire pit. A second side of the bracket may be attached to the beverage holder. The second side of the bracket may include a first tab and a second tab. The beverage holder may pivot relative to the bracket at a fastener so that the beverage holder may be positioned perpendicular to an edge of the mantel of the fire pit when limited by the first tab. The beverage holder may be stored under the mantel of the firepit when limited by the second tab.

Another embodiment of the present disclosure is a system for holding a beverage. The system may comprise a fire pit. The system may comprise a mantel attached to the fire pit. The system may comprise a beverage holder assembly. The beverage holder assembly may comprise a beverage holder. The beverage holder assembly may comprise a bracket. A first side of the bracket may be attached to an underside of the mantel. A second side of the bracket may be attached to the beverage holder.

Another embodiment of the present disclosure is a system for holding a beverage. The system may comprise a fire pit. The system may comprise a mantel attached to the fire pit. The system may comprise a beverage holder assembly. The beverage holder assembly may comprise a beverage holder. The beverage holder assembly may comprise a bracket. A first side of the bracket may be attached to an underside of the mantel. A second side of the bracket may be attached to the beverage holder. The second side of the bracket may include a first tab and a second tab. The beverage holder may pivot relative to the bracket at a fastener so that the beverage holder may be positioned perpendicular to an edge of the mantel of the fire pit when limited by the first tab. The beverage holder may be stored under the mantel of the firepit when limited by the second tab.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
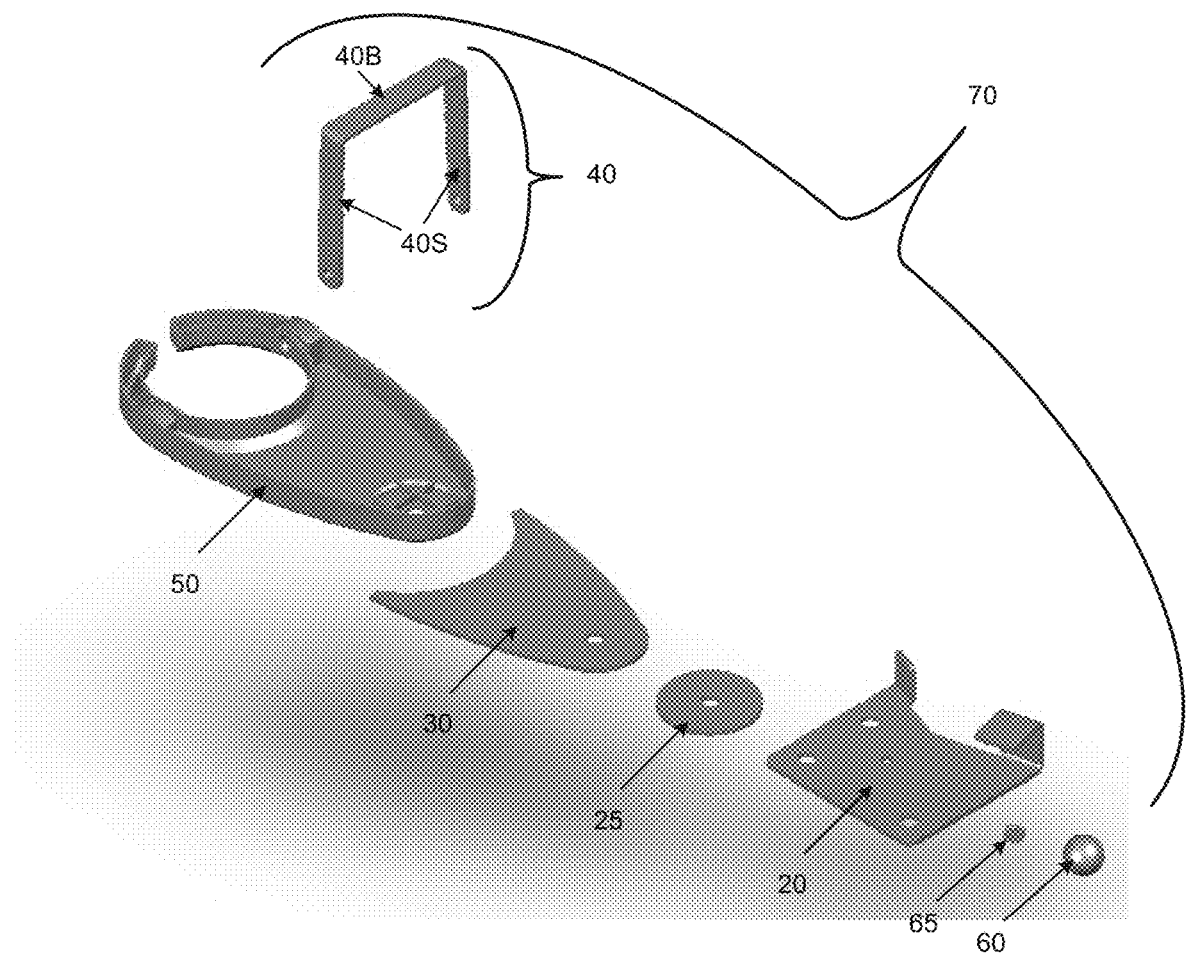
FIG. 1A is a side exploded view of a beverage holder assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1A is a side exploded view of a beverage holder assembly, arranged in accordance with at least some embodiments described herein. Beverage holder assembly 70 may include a bracket 20, a beverage holder 50, a spacer 30, a washer 25, a support bar 40, a fastener 60, and a nut 65. Beverage holder 50 may be made from a heat resistant material, including epoxy, silicone, thermo plastic rubber (TPR), nylon glass, acrylonitrile butadiene styrene (ABS), polyethylene, polypropylene, and ceramic. Beverage holder 50 may be coated with a heat resistant material, including epoxy coatings, silicone coatings, ceramic coatings, thermo plastic rubber (TPR) coating, nylon glass coating, acrylonitrile butadiene styrene (ABS) coating, polyethylene coating, polypropylene coating, high temperature silicone coating, high temperature silicone acrylic coating, heat resistant cold spray aluminum, and powder coatings.

Support bar 40 may attach to a bottom side of beverage holder 50. Support bar 40 may include a flat base 40B and two side rails 40S. Each side rail 40S may have a first end and a second end. First end of a first side rail 40S may extend out perpendicularly from a first end of flat base 40B. First end of a second side rail 40S may extend out perpendicularly from a second end of flat base 40B. Second end of first side rail 40S and second end of second side rail 40S may be attached to beverage holder 50 so that support bar 40 may pivot with respect to a bottom side of beverage holder 50 at attachment points of a second end of first side rail 40S and a second end of second side rail 40S.

Figure 1B:
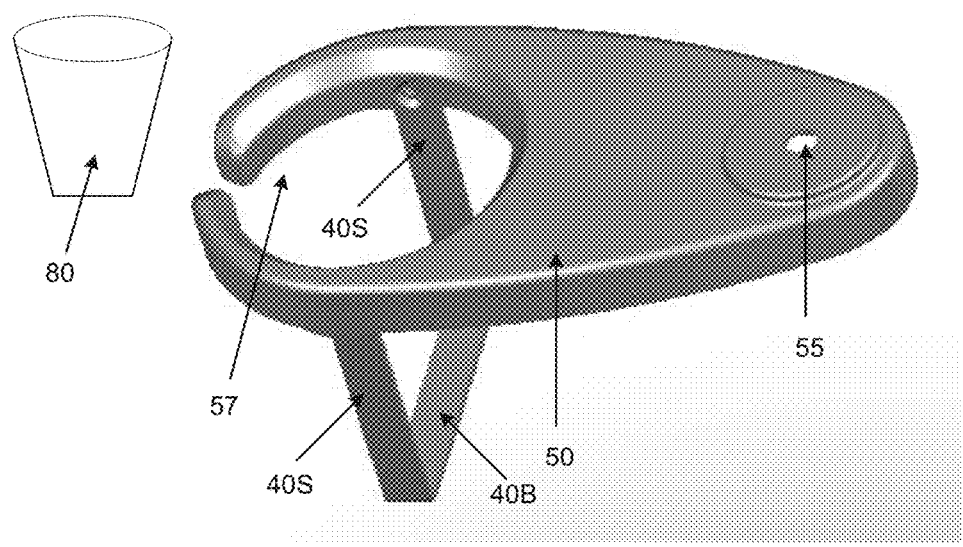
FIG. 1B is a side view of a top of a beverage holder with a support bar.

FIG. 1B is a top perspective view of a beverage holder with a support bar, arranged in accordance with at least some embodiments described herein. Those components in FIG. 1B that are labeled identically to components of FIG. 1A will not be described again for the purposes of brevity. Walls of beverage holder 50 may define an opening 55 through beverage holder 50. Fastener 60 may be threaded through opening 55 to secure beverage holder 50 to an apparatus, such as a table, mantel, or fire pit. Any other fastening means known in the art may be used to releasably or fixedly attach the beverage holder to an apparatus.

Walls of beverage holder 50 may define an essentially circular aperture 57, although other shapes are contemplated. Aperture 57 may be configured to receive a cup, can, mug, glassware, bottle, thermos, or other beverage container 80 within aperture 57. Support bar 40, attached to beverage holder 50, may support cup, can, mug, glassware, bottle, thermos, or other beverage container 80 placed within aperture 57. Cup, can, mug, glassware, bottle, thermos, or other beverage container 80 placed within aperture 57 may be supported by flat base 40B and two side rails 40S.

Figure 2:
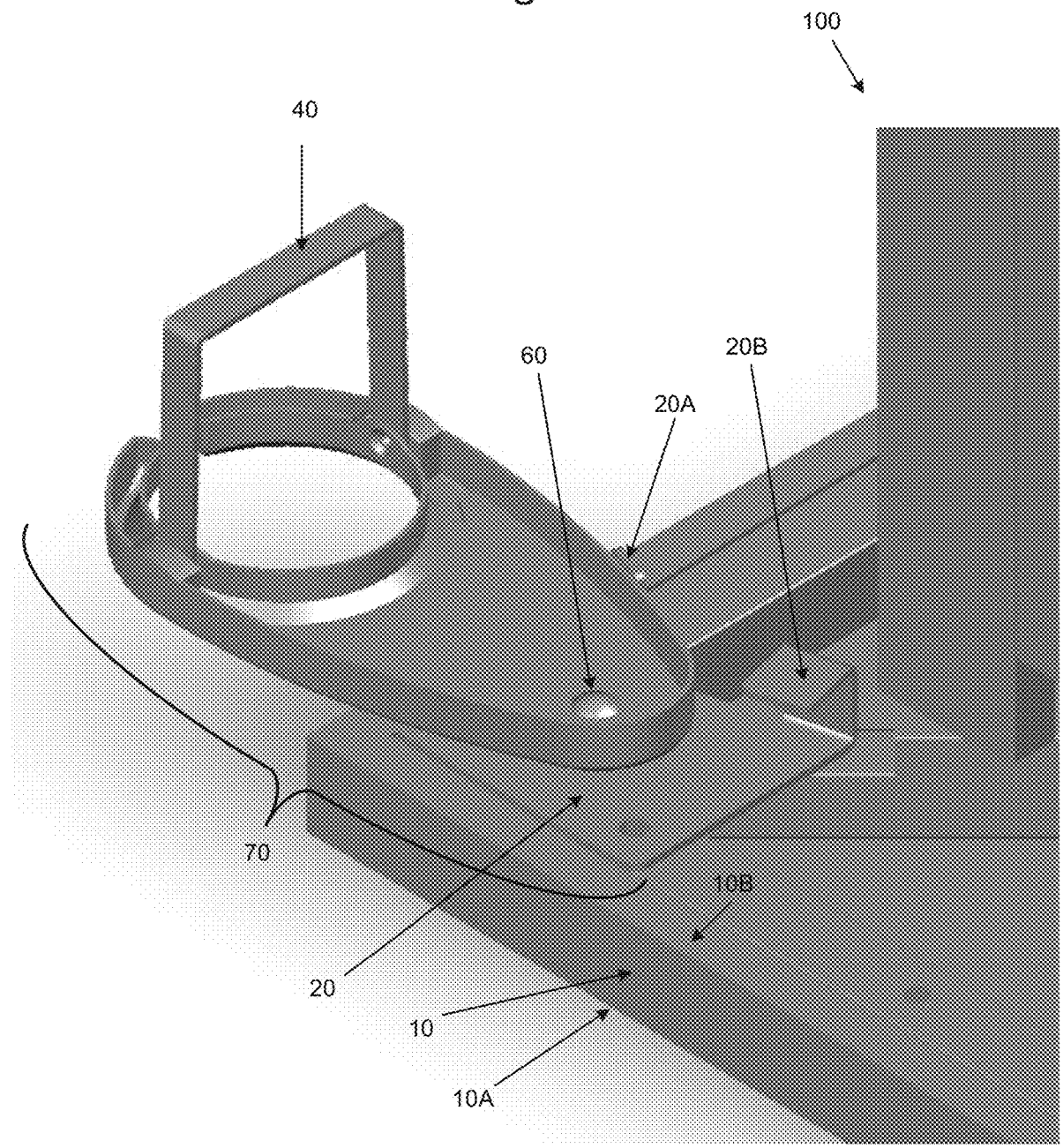
FIG. 2 is a bottom view of a beverage holder assembly attached to a mantel of a fire pit.

FIG. 2 is a bottom view of a beverage holder assembly attached to a mantel of a fire pit, arranged in accordance with at least some embodiments described herein. Those components in FIG. 2 that are labeled identically to components of FIGS. 1A-1B, will not be described again for the purposes of brevity.

Fire pit 100 may include a mantel 10. Mantel 10 may have a top side 10A and a bottom side 10B. Beverage holder assembly 70 may be releasably attached to bottom side 10B of mantel 10, although it is contemplated that the beverage holder assembly may be releasably attached to the top side 10A by any means known in the art. Fastener 60 may be threaded through spacer 30, washer 25, beverage holder 50, and bracket 20 to secure beverage holder assembly 70 to bottom side 10B of mantel 10. Beverage holder 50 may be able to pivot at fastener 60 and may swivel relative to bracket 20 and mantel 10. Nut 65, shown in FIG. 1A may be used with fastener 60 and may secure bracket 20 in a fixed position relative to mantel 10, although any other fastening means known in the art may be contemplated.

A first side of bracket 20 may be in contact with bottom side 10B of mantel 10. A second side of bracket 20 may be in contact with a top side of beverage holder 50. Second side of bracket 20 may include tabs 20A, 20B which may limit a range that beverage holder 50 may swivel relative to mantel 10. For example, tab 20A may be configured to limit swivel of beverage holder 50 so that beverage holder 50 may be positioned essentially perpendicular to an edge of mantel 10. In another example, tab 20B may be configured to limit swivel of beverage holder 50 so that beverage holder 50 may swivel underneath mantel 10 with an entirety of beverage holder 50 positioned under mantel 10. Beverage holder 50 may be stored under mantel 10 when beverage holder 50 is swiveled and limited by tab 20B, when beverage holder 50 is not in use.

Multiple beverage holder assemblies 70 may be attached to mantel 10 of fire pit 100. For example, four beverage holder assemblies 70 may be attached to mantel 10 of fire pit 100 when mantel 10 is rectangular or square in shape, with one beverage holder assembly 70 attached to the underside of mantel 10 at each corner of mantel 10. Even if the fire pit is in a round configuration, multiple beverage holder assemblies 70 may be attached to the mantel of the fire pit around the fire pit equally spaced apart.

Figure 3A:
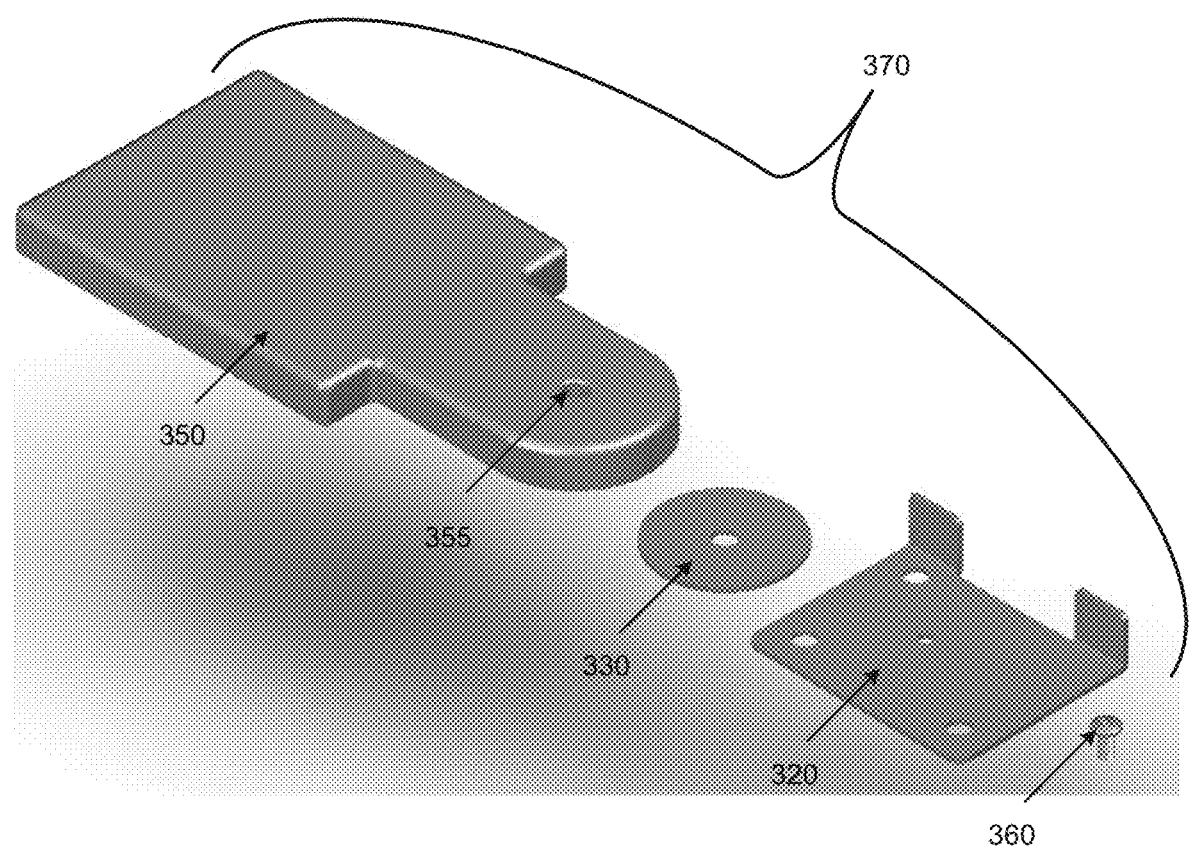
FIG. 3A is a side exploded view of a beverage holder assembly.

FIG. 3A is a side exploded view of a beverage holder assembly, arranged in accordance with at least some embodiments described herein. Those components in FIG. 3 that are labeled identically to components of FIGS. 1-2 will not be described again for the purposes of brevity.

Beverage holder assembly 370 may include a bracket 320, a washer 330, a beverage holder 350, and a fastener 360. Beverage holder 350 may be made from a heat resistant material, including epoxy, silicone, thermo plastic rubber (TPR), nylon glass, acrylonitrile butadiene styrene (ABS), polyethylene, polypropylene, and ceramic. Beverage holder 350 may be coated with a heat resistant material, including epoxy coatings, silicone coatings, ceramic coatings, thermo plastic rubber (TPR) coating, nylon glass coating, acrylonitrile butadiene styrene (ABS) coating, polyethylene coating, polypropylene coating, high temperature silicone coating, high temperature silicone acrylic coating, heat resistant cold spray aluminum, and powder coatings. Walls of beverage holder 350 may define an opening 355 through beverage holder 350. Fastener 360 may be threaded through opening 355 to secure beverage holder 350 to an apparatus, such as a table, mantel, or fire pit. Any other fastening means known in the art may be used to releasably or fixedly attach the beverage holder to an apparatus.

Figure 3B:
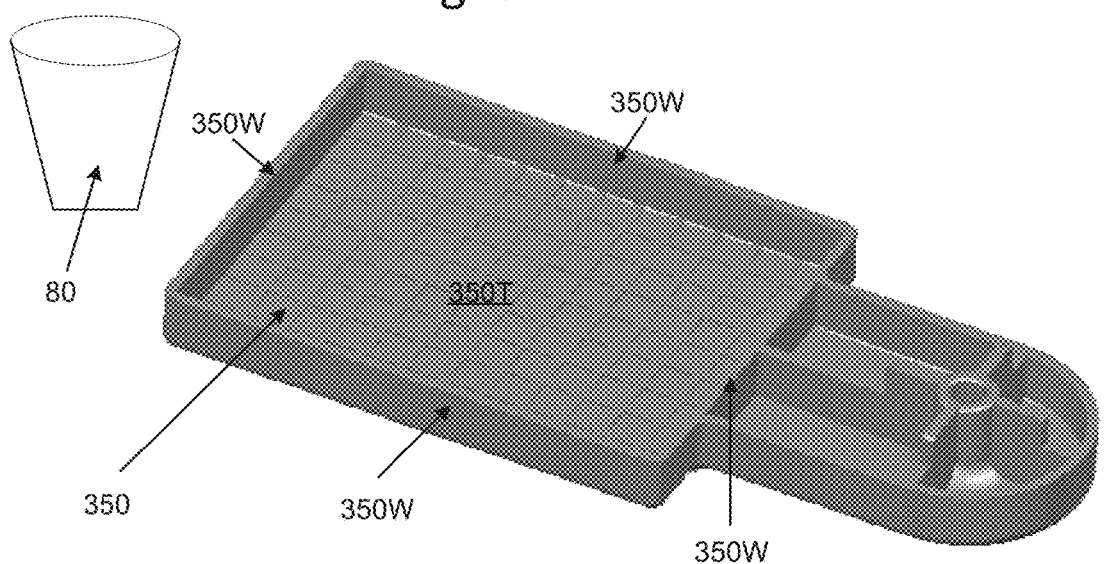
FIG. 3B is a side view of a top of a beverage holder.

FIG. 3B is a top perspective view of a beverage holder, arranged in accordance with at least some embodiments described herein. Those components in FIG. 3B that are labeled identically to components of FIGS. 1-3A will not be described again for the purposes of brevity.

Beverage holder 350 may include a flat, rectangular shaped, textured surface 350T. Beverage holder 350 may also be a circular, square, or oval shape, or any shape contemplated for holding a cup, bottle, can, mug, glassware, thermos, or other beverage container. Textured surface 350T may be bordered by walls 350W. Walls 350W may be ¼-¾ inches in height from textured surface 350T. Textured surface 350T may be slip resistant and may support and prevent sliding of cup, can, mug, glassware, bottle, thermos, or other beverage container 80 placed upon textured surface 350T. Alternatives for achieving a non-slip surface such as textured surface 350T may also include a rubber or silicone material, or any non-slip material known in the art, which can be shaped to fit in accordance with the shape of beverage holder 350. Cup, can, mug, glassware, bottle, thermos, or other beverage container 80 placed upon textured surface 350T may further be prevented from sliding by border walls 350W.

Figure 4:
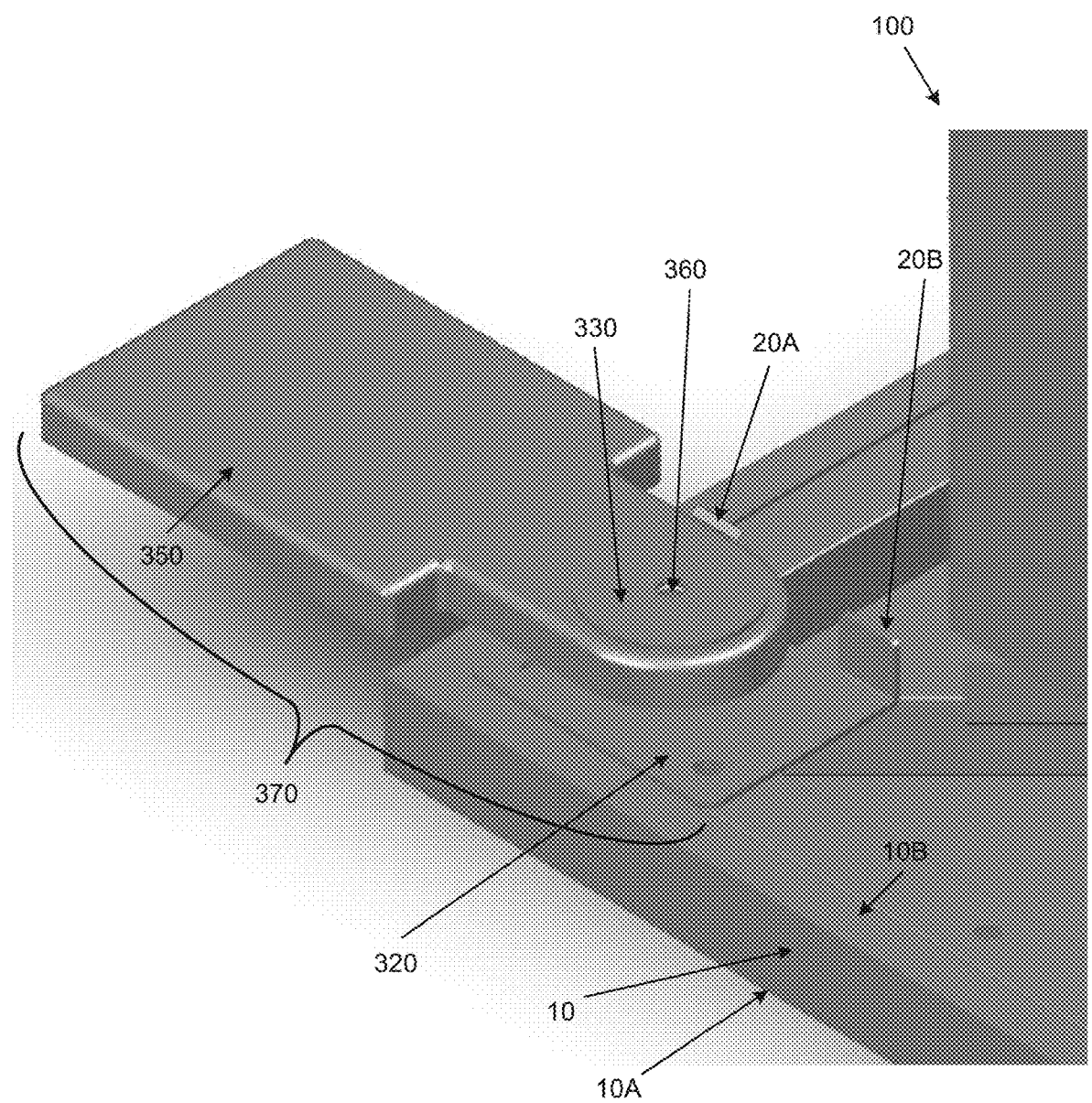
FIG. 4 is a bottom view of a beverage holder assembly attached to a mantel of a fire pit.

FIG. 4 is a bottom view of a beverage holder assembly attached to a mantel of a fire pit, arranged in accordance with at least some embodiments described herein. Those components in FIG. 4 that are labeled identically to components of FIGS. 1-3B, will not be described again for the purposes of brevity.

Beverage holder assembly 370 may be attached to bottom side 10B of mantel 10 of fire pit 100. Fastener 360 may be threaded through washer 330, beverage holder 350, and base bracket 320 to releasably secure beverage holder assembly 370 to bottom side 10B of mantel 10. Beverage holder 350 may be able to pivot at fastener 360 and may swivel relative to mantel 10.

A first side of base bracket 320 may be in contact with bottom side 10B of mantel 10. A second side of base bracket 320 may be in contact with a top side of beverage holder 350. Base bracket 320 may include tabs 320A, 320B which may limit a range that beverage holder 350 may swivel relative to mantel 10. For example, tab 320A may be configured to limit swivel of beverage holder 350 so that beverage holder 350 is essentially perpendicular to an edge of mantel 10. In another example, tab 320B may be configured to limit swivel of beverage holder 350 so that beverage holder 350 may swivel underneath mantel 10 with an entirety of beverage holder 350 positioned under mantel 10. Beverage holder 350 may be stored under mantel 10 when beverage holder 350 is swiveled and limited by tab 320B, when beverage holder 50 is not in use.

Multiple beverage holder assemblies 370 may be attached to mantel 10 of fire pit 100. For example, four beverage holder assemblies 370 may be attached to mantel 10 of fire pit 100 when mantel 10 is rectangular or square in shape, with one beverage holder assembly 370 attached to the underside of mantel 10 at each corner of mantel 10. Even if the fire pit is in a round configuration, multiple beverage holder assemblies 370 may be attached to the mantel of the fire pit around the fire pit equally spaced apart.

Figure 5A:
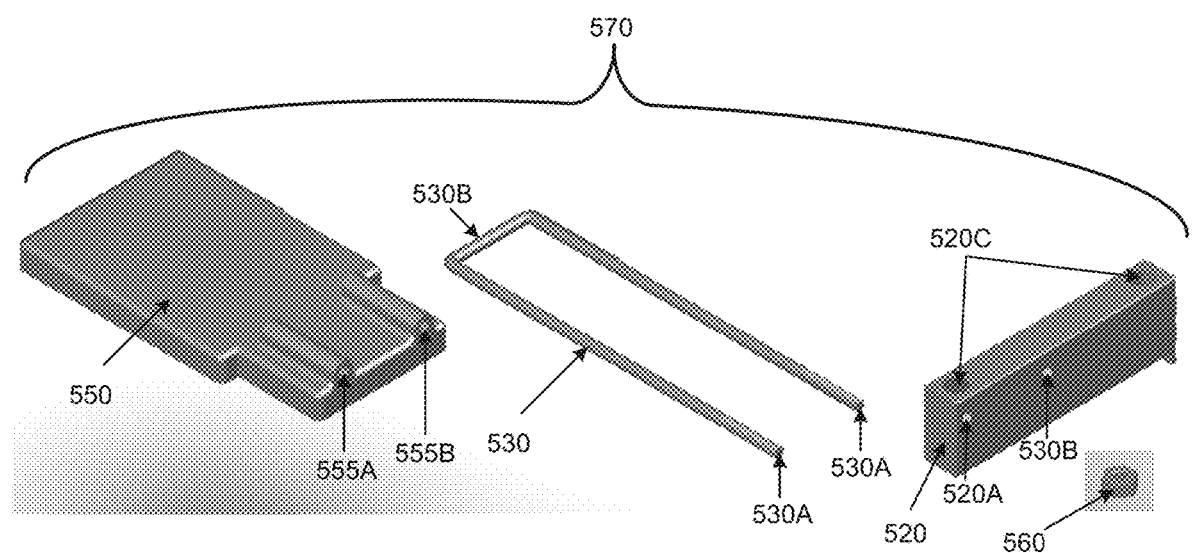
FIG. 5A is a side exploded view of a beverage holder assembly.

FIG. 5A is a side exploded view of a beverage holder assembly, arranged in accordance with at least some embodiments described herein. Those components in FIG. 5A that are labeled identically to components of FIG. 1-4 will not be described again for the purposes of brevity.

Beverage holder assembly 570 may include a bracket 520, a U-bolt 530, a beverage holder 550, and fasteners 560. Beverage holder 550 may be made from a heat resistant material, including epoxy, silicone, thermo plastic rubber (TPR), nylon glass, acrylonitrile butadiene styrene (ABS), polyethylene, polypropylene, and ceramic. Beverage holder 550 may be made from or coated with a heat resistant material, including epoxy coatings, silicone coatings, ceramic coatings, thermo plastic rubber (TPR) coating, nylon glass coating, acrylonitrile butadiene styrene (ABS) coating, polyethylene coating, polypropylene coating, high temperature silicone coating, high temperature silicone acrylic coating, heat resistant cold spray aluminum, and powder coatings. Walls of beverage holder 550 may define openings 555A and 555B along a bottom of beverage holder 550. U-bolt 530 may include ends 530A and base 530B. Ends 530A may be threaded through openings 555A, 555B to attach U-bolt 530 to beverage holder 550 with ends 530A protruding out from beverage holder 550. A fastener 560 may be releasably threaded on each end 530A and threaded up each end 530A of U-bolt 530 a distance comparable to a thickness of bracket 520. Bracket 520 may include openings 520A and 520B. Ends 530A may be threaded through openings 520A and 520B to attach U-bolt 530 to bracket 520. A fastener 560 may be attached to each end 530A to secure U-bolt 530 to bracket 520. U-bolt 530 may be secured to bracket 520 by tightening of fasteners 560 on both sides of bracket 520 for each end 530A of U-bolt 530.

Figure 5B:
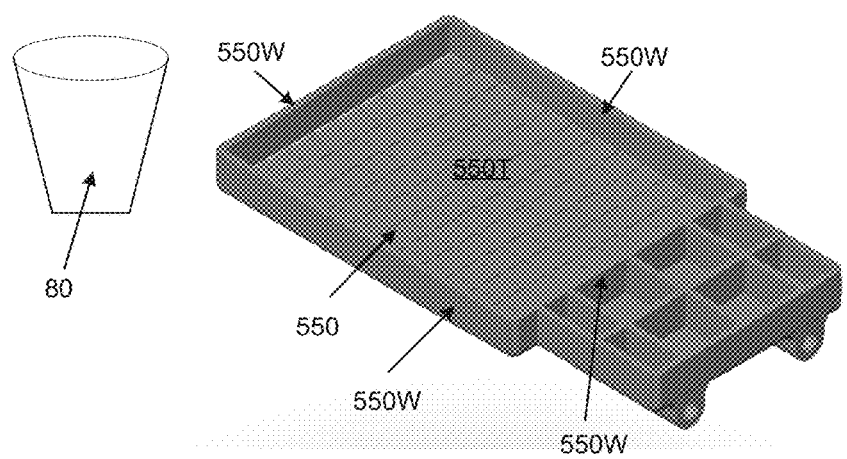
FIG. 5B is a side view of a top of a beverage holder.

FIG. 5B is a top perspective view of a beverage holder, arranged in accordance with at least some embodiments described herein. Those components in FIG. 5B that are labeled identically to components of FIGS. 1-5A will not be described again for the purposes of brevity.

Beverage holder 550 may include a flat, rectangular shaped, textured surface 550T. Beverage holder 550 may also be a circular, square, or oval shape, or any shape contemplated for holding a cup, bottle, can, mug, glassware, thermos, or other beverage container. Textures surface 550T may be bordered by walls 550W. Textured surface 550T may be slip resistant and may support and prevent sliding of cup, can, mug, glassware, bottle, thermos, or other beverage container 80 placed upon textured surface 550T. Alternatives for achieving a non-slip surface such as textured surface 350T may also include a rubber or silicone material, or any non-slip material known in the art, which can be shaped to fit in accordance with the shape of beverage holder 350. Cup, can, mug, glassware, bottle, thermos, or other beverage container 80 placed upon textured surface 550T may further be prevented from sliding by border walls 550W.

Figure 6:
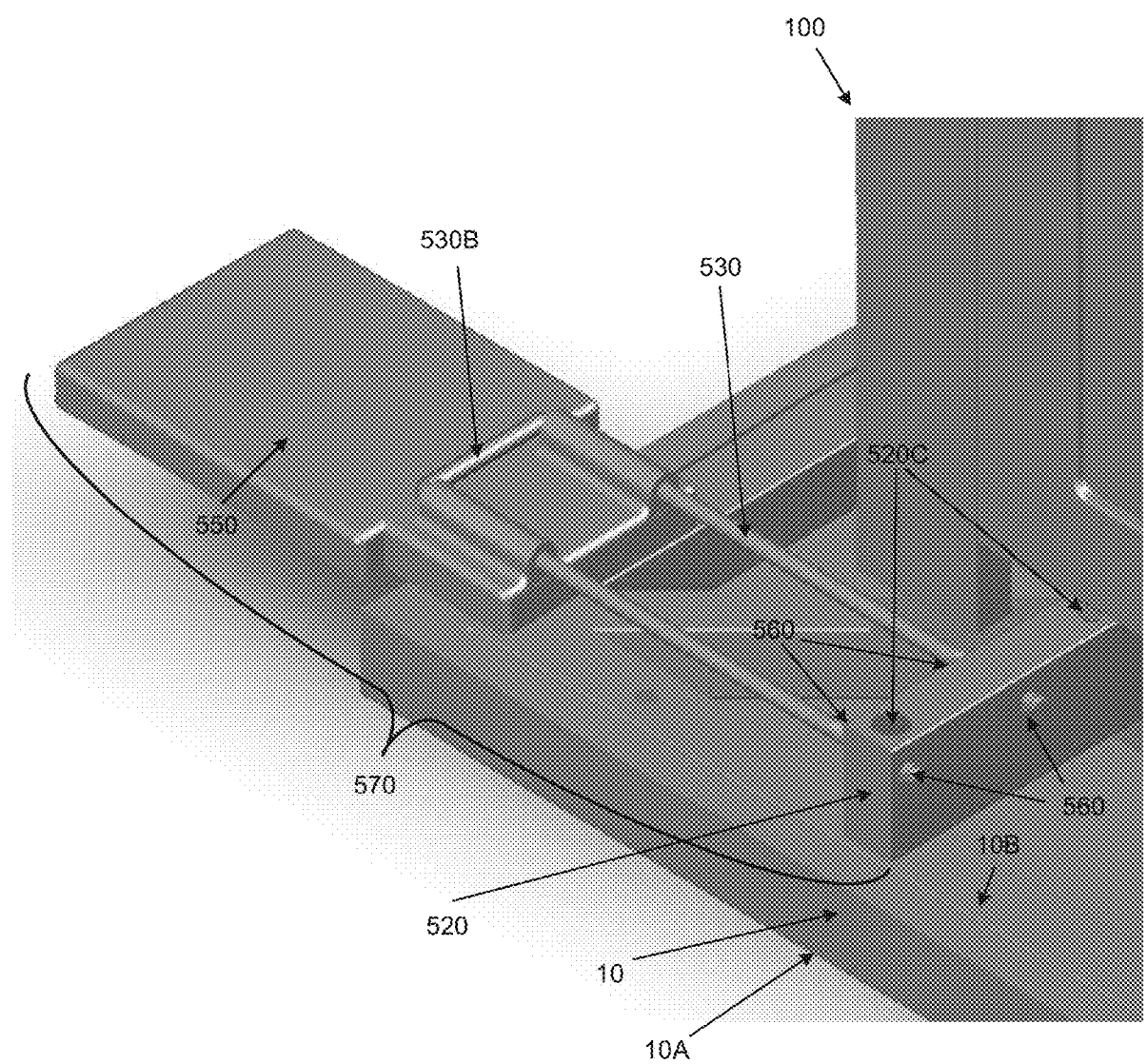
FIG. 6 is a bottom view of a beverage holder assembly attached to a mantel of a fire pit, all arranged according to at least some embodiments described herein.

FIG. 6 is a bottom view of a beverage holder assembly attached to a mantel of a fire pit, arranged in accordance with at least some embodiments described herein. Those components in FIG. 6 that are labeled identically to components of FIGS. 1-5B, will not be described again for the purposes of brevity.

Beverage holder assembly 570 may be attached to bottom side 10B of mantel 10 of fire pit 100. Bracket 520 may be releasably secured to bottom side 10B of mantel 10 by fasteners through openings 520C of bracket 520, although it is contemplated that the beverage holder assembly may be releasably attached to the top side 10A by any means known in the art.

Beverage holder 550 may be configured to slide along U-bolt 530 from U-bolt base 530B to fasteners 560 at U-bolt ends 530A. When beverage holder 550 is slid along U-bolt 530 to U-bolt base 530B, beverage holder 550 may project out from mantel 10 essentially perpendicular to an edge of mantel 10 and be accessible to a user. When beverage holder 550 is slid along U-bolt 530 to fasteners 560 at U-bolt ends 530A an entirety of beverage holder 550 may be positioned under mantel 10. Beverage holder 550 may be stored under mantel 10 when beverage holder 550 is slid along U-bolt 530 to fasteners 560 at U-bolt ends 530A.

In an embodiment, a user may slide beverage holder 550 along U-bolt 530 to pull beverage holder 550 out from under mantel 10 and to push beverage holder 550 underneath mantel 10. In other embodiments, beverage holder 550 may be attached to bottom side 10B of mantel 10 with a push and slide extender which may include a metal column that defines multiple holes along the metal column and a metal pin within the metal column which can project out from the metal column through any of the holes and can be pushed into the column to adjust the slide extender to a different position with the metal pin projecting out from a different hole. In another embodiment, beverage holder 550 may be attached to bottom side 10B of mantel 10 with a swing hinge or an ellipse envelop mechanism. In another embodiment, beverage holder 550 may be attached to bottom side 10B of mantel 10 with a slide mechanism that is spring powered and includes a locking mechanism so that a user may push beverage holder 550 to release beverage holder 550 from a locked position beneath mantel 10.

Multiple beverage holder assemblies 570 may be attached to mantel 10 of fire pit 100. For example, four beverage holder assemblies 570 may be attached to mantel 10 of fire pit 100 when mantel 10 is rectangular or square in shape, with one beverage holder assembly 570 attached to the underside of mantel 10 at each corner of mantel 10. Even if the fire pit is in a round configuration, multiple beverage holder assemblies 570 may be attached to the mantel of the fire pit around the fire pit equally spaced apart.

A device in accordance with the present disclosure may provide a user of a fire pit with retractable beverage holders that can be stored under a mantel of the fire pit when not in use. A device in accordance with the present disclosure may provide a user with beverage holders that do not interfere with the operation of a fire pit. A device in accordance with the present disclosure may provide a user with beverage holders for a fire pit so as to prevent users from placing a beverage upon the mantel of a fire pit. A device in accordance with the present disclosure may provide a user with beverage holders for a fire pit which may prevent spills and possible hazards associated with potentially flammable drinks spilling upon an open flame of the fire pit.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A beverage holder assembly for a fire pit, the beverage holder assembly comprising:
    a beverage holder; and
    a bracket, wherein the bracket includes a first side and a second side, the first side of the bracket is attached to a bottom side of a mantel of the fire pit, the mantel being a table structure around a bowl of the fire pit, the second side of the bracket is attached to the beverage holder, the beverage holder being configured to pivot or slide relative to the bracket so that the beverage holder can be positioned perpendicular to an edge of the mantel of the firepit when in use and can be stored under the mantel of the firepit when not in use.

2. The beverage holder assembly of claim 1, wherein the beverage holder includes walls and the walls of the beverage holder define an aperture configured to receive a cup, can, mug, glassware, bottle, thermos, or other beverage container within the aperture.

3. The beverage holder assembly of claim 2, wherein the beverage holder includes a support bar attached to a bottom side of the beverage holder and the support bar includes a flat base and two side rails to support the cup, can, mug, glassware, bottle, thermos, or other beverage container placed within the aperture.

4. The beverage holder assembly of claim 1, wherein the beverage holder includes a flat surface.

5. The beverage holder assembly of claim 4, wherein the flat surface is textured, slip resistant, and bordered by walls.

6. The beverage holder assembly of claim 1, wherein the beverage holder is attached to the bracket with a U-bolt, and the beverage holder is configured to slide along the U-bolt.

7. The beverage holder of assembly claim 6, wherein the beverage holder includes a flat surface.

8. The beverage holder assembly of claim 7, wherein the flat surface is textured, slip resistant, and bordered by walls.

9. A beverage holder assembly for a fire pit, the beverage holder assembly comprising:
    a beverage holder; and
    a bracket, wherein a first side of the bracket is attached to a bottom side of a mantel of the fire pit, the mantel being a table structure around a bowl of the fire pit, a second side of the bracket is attached to the beverage holder and includes a first tab and a second tab, the beverage holder being configured to pivot relative to the bracket so that the beverage holder can be positioned perpendicular to an edge of the mantel of the fire pit when limited by the first tab and the beverage holder can be stored under the mantel of the firepit when limited by the second tab.

10. The beverage holder assembly of claim 9, wherein the beverage holder includes walls and the walls of the beverage holder define an aperture configured to receive a beverage, can, mug, glassware, bottle, thermos, or other beverage container within the aperture.

11. The beverage holder assembly of claim 10, wherein the beverage holder includes a support bar attached to a bottom side of the beverage holder and the support bar includes a flat base and two side rails to support the cup, can, mug, glassware, bottle, thermos, or other beverage container placed within the aperture.

12. The beverage holder assembly of claim 11, wherein the support bar pivots with respect to the bottom side of the beverage holder.

13. The beverage holder assembly of claim 9, wherein the beverage holder includes a flat surface, and the flat surface is textured, slip resistant, and bordered by walls.

14. A system for holding a beverage, the system comprising:
    a fire pit;
    a mantel attached to the fire pit, wherein the mantel is a table structure around a bowl of the fire pit; and
    at least one beverage holder assembly;
    wherein, the at least one beverage holder assembly comprises:
        a beverage holder; and
        a bracket, wherein a first side of the bracket is attached to a bottom side of the mantel, a second side of the bracket is attached to the beverage holder, the beverage holder being configured to pivot or slide relative to the bracket so that the beverage holder can be positioned perpendicular to an edge of the mantel of the firepit when in use and can be stored under the mantel of the firepit when not in use.

15. The system of claim 14, wherein walls of the beverage holder define an aperture configured to receive a cup, can, mug, glassware, bottle, thermos, or other beverage container within the aperture, the beverage holder includes a support bar attached to a bottom side of the beverage holder, the support bar includes a flat base and two side rails to support the cup, can, mug, glassware, bottle, thermos, or other beverage container placed within the aperture, and the support bar pivots with respect to the bottom side of the beverage holder.

16. The system of claim 14, wherein the beverage holder includes a flat surface, and the flat surface is textured, slip resistant, and bordered by walls.

17. The system of claim 14, wherein the beverage holder is attached to the bracket with a U-bolt, the beverage holder is configured to slide along the U-bolt, the beverage holder includes a flat surface, and the flat surface is textured, slip resistant, and bordered by walls.

18. The system of claim 14, wherein the mantel of the fire pit is rectangular or square in shape and the fire pit comprises at least one beverage holder assembly at each corner of the mantel.

\* \* \* \* \*